(12) United States Patent
Lesiv

(10) Patent No.: US 12,043,552 B2
(45) Date of Patent: Jul. 23, 2024

(54) REACTOR FOR SEPARATION OF SODIUM CHLORIDE AND POTASSIUM CHLORIDE FROM POLYMINERAL SOURCES AND METHOD THEREOF

(71) Applicant: LIMITED LIABILITY COMPANY "GSM CHEMICAL", Moscow (RU)

(72) Inventor: Aleksey Valeryevich Lesiv, Moskovskaya obl. (RU)

(73) Assignee: LIMITED LIABILITY COMPANY "GSM CHEMICAL", Moscow (RU)

( * ) Notice: Subject to any disclaimer, the term of this patent is extended or adjusted under 35 U.S.C. 154(b) by 999 days.

(21) Appl. No.: 16/965,082

(22) PCT Filed: Jan. 14, 2019

(86) PCT No.: PCT/RU2019/000011
§ 371 (c)(1),
(2) Date: Jul. 27, 2020

(87) PCT Pub. No.: WO2019/151897
PCT Pub. Date: Aug. 8, 2019

(65) Prior Publication Data
US 2021/0114890 A1  Apr. 22, 2021

(30) Foreign Application Priority Data
Jan. 31, 2018 (RU) .......................... RU2018103759

(51) Int. Cl.
*B01D 9/00* (2006.01)
*B03D 1/02* (2006.01)
(Continued)

(52) U.S. Cl.
CPC ............. *C01D 3/08* (2013.01); *B01D 9/0004* (2013.01); *B01D 9/0036* (2013.01);
(Continued)

(58) Field of Classification Search
None
See application file for complete search history.

(56) References Cited

U.S. PATENT DOCUMENTS 2,211,397 A   8/1940  Weinig
3,655,333 A   4/1972  Stenger et al.
(Continued)

FOREIGN PATENT DOCUMENTS

CA       2015165 A1 * 11/1990
CN     102203012 A      9/2011
(Continued)

OTHER PUBLICATIONS

A Chinese Office Action and Search Report to Corresponding Application No. 201980009067.2 dated Aug. 11, 2021. (8 pages).
(Continued)

*Primary Examiner* — Sheng H Davis
(74) *Attorney, Agent, or Firm* — Dority & Manning, P.A.

(57) ABSTRACT

The present invention relates to sylvinite ore processing in the extraction industry and provides a resource-efficient method of separating potassium chloride and sodium chloride from polymineral sources comprising potassium chloride and sodium chloride and a vertical three-zone reactor for separating potassium chloride and sodium chloride from polymineral sources comprising potassium chloride and sodium chloride.

15 Claims, 3 Drawing Sheets

(51) Int. Cl.
*B03D 1/14* (2006.01)
*C01D 3/08* (2006.01)
*C01D 3/16* (2006.01)

(52) U.S. Cl.
CPC ............ *B01D 9/0045* (2013.01); *B03D 1/02* (2013.01); *B03D 1/1468* (2013.01); *C01D 3/16* (2013.01); *B01D 2009/0086* (2013.01); *C01P 2006/80* (2013.01)

(56) References Cited

U.S. PATENT DOCUMENTS

| | | | |
|---|---|---|---|
| 3,891,544 | A | 6/1975 | Becker et al. |
| 4,504,092 | A | 3/1985 | Bichara et al. |
| 5,906,660 | A | 5/1999 | Pardini et al. |

FOREIGN PATENT DOCUMENTS

| | | | |
|---|---|---|---|
| CN | 102963912 | A | 3/2013 |
| CN | 103253685 | A | 8/2013 |
| CN | 103787372 | A | 5/2014 |
| CN | 104058427 | A | 9/2014 |
| CN | 106185994 | A | 12/2016 |
| CN | 106914030 | A | 7/2017 |
| DE | 4422034 | | 8/1995 |
| FR | 2353673 | * | 2/1978 |
| GB | 648903 | A | 1/1951 |
| GB | 1240667 | | 7/1971 |
| RU | 2441183 | C1 | 1/2012 |

OTHER PUBLICATIONS

PCT International Search Report and Written Opinion for International Application No. PCT/RU2019/000011 dated Jun. 24, 2019 (11 pages).

* cited by examiner

REACTOR FOR SEPARATION OF SODIUM CHLORIDE AND POTASSIUM CHLORIDE FROM POLYMINERAL SOURCES AND METHOD THEREOF

FIELD OF THE INVENTION

The present invention relates to sylvinite ore processing in the extraction industry and provides a resource-efficient method of separating potassium chloride and sodium chloride from polymineral sources comprising potassium chloride and sodium chloride and a vertical three-zone reactor for separating potassium chloride and sodium chloride from polymineral sources comprising potassium chloride and sodium chloride.

PRIOR ART

Over several decades now, two main methods for enriching potash ore have been known: a chemical (halurgic) method and a flotation method.

The halurgic method is the oldest technique used since the dawn of the potash industry in the XIX century. The main idea of the halurgic separation of potassium chloride from sylvinite also known as the selective dissolution and separate crystallization method is based on the differences between solubility temperature coefficients of potassium and sodium chlorides in their joint presence, i.e. in the system "KCl—NaCl—$H_2O$". In solutions saturated with both salts, temperature increase from 20° C. to 100° C., results in potassium chloride content going up approximately two times, and sodium chloride slightly decreasing. When such hot solution is cooled down, it becomes supersaturated with potassium chloride that further crystallizes, while sodium chloride remains in the solution. Subsequently heated, the solution stays saturated with sodium chloride and becomes unsaturated with respect to potassium chloride. This is why treating new sylvinite with such solution will only draw potassium chloride into the liquid phase, while sodium chloride will remain undissolved. This intrinsic property of the KCl—NaCl—$H_2O$ system is used in the halurgic method of separation of potassium chloride from sylvinite ores to ensure a cyclic process (see Pozin M. E. Tehnologiya mineralnyh solej (Udobrenij, pesticidov, promyshlennyh solej, okislov i kislot). Chast 1/Pozin M. E. Technology mineral salts (fertilizers, pesticides, industrial salts, sesquioxides and acids). Part 1, ed. 4, Leningrad, ed. Khimiia, 1974, p. 146-161.).

The advantage of this method is in the highest purity of the potassium chloride resulting therefrom, with up to 98% of the useful constituent. The drawback of the halurgic method potassium chloride is not entirely extracted from the ore, but only up to 86-88%. The content of potassium in the halite waste is 2-3%. Besides, this method is known for high energy consumption for heating and cooling of the solutions.

Other disadvantage of the method is a high level of contamination of the halite waste with foreign substances, which prevents the said halite to be commercialized as sodium chloride.

In physical and chemical terms, the halurgic method consists in dissolution and recrystallization of only one of two solid phases contained in sylvinite, namely, potassium chloride. The main component—halite—remains in its native state, which means that potassium chloride particles encapsulated halite crystal aggregates are not released into the solution. Particles of insoluble minerals (calcium sulfate anhydrite, dolomite, clay) remain bonded with the halite constituent of the ore. That is what causes potassium losses and a high level of contamination of the halite waste in this enrichment method.

Since the 1960s, potash fertilizers with up to 95% of the useful component have been produced using the flotation method. Currently, the flotation method is predominant in the potash industry. The flotation method consists in the separation of KCl and NaCl comprised in the ore that has been freed from clay slime. Separation of minerals by flotation is based on different water affinity of their surfaces. Pre-ground ore is suspended in a solution saturated with KCl and NaCl, throughout which air is passed and distributed in the form of small bubbles. Hydrophobic minerals adhere to air bubbles and are carried off to surface of the suspension as a froth, which is then removed and filtered to separate solid particles. Hydrophilic minerals precipitate onto the bottom of the flotation machine and are removed through a drain opening. However, most minerals have high water affinity, which is why the enrichment of natural ores requires flotation agents to be used. The use of these agents allows targeted change of mineral surface wettability and, respectively, controlled flotation. Depending on their purpose, the following groups of flotation agents are distinguished: collectors, froth generators, depressors, activators, environment regulators. Flotation methods of production of potassium chloride vary depending on a mineral and granulometric composition of the floated sylvinite, as well impurity content (clay slime), particle size of components, and clay slime processing methods (see Pozin M.E. Tehnologiya mineralnyh solej (udobrenij, pesticidov, promyshlennyh solej, okislov i kislot). Chast 1/Pozin M. E. Technology mineral salts (fertilizers, pesticides, industrial salts, sesquioxides and acids). Part 1 ed. 4, Leningrad, ed. Khimiia, 1974, p. 164-170).

Flotation enrichment of sylvinite ores includes the following principal operations:
  crushing and grinding of sylvinite ore down to particle size of 1 to 3 mm followed by wet milling down to 0.5 mm,
  removal of clay slime from ore prior to flotation or suppression of clay slime in the main flotation process,
  main flotation with the extraction of KCl into a froth and subsequent cleaning of the resulting concentrate,
  cleaning of clay slime to reduce losses of KCl,
  dehydration of tailings, slime and concentrate; return of the solution into the process cycle.

The flotation method is efficient for potassium chloride extraction from high-quality sylvinite ores comprising minor amounts of slime. The potassium chloride extraction rate is up to 86%, and the finished product (concentrate) contains 93% to 95% of potassium chloride. The advantage of this method is lower capital and operating expense rate compared to that of the halurgic method. The drawback of the flotation method is lower content of potassium chloride in the concentrate, which is no more than 95%.

In physical and chemical terms, the flotation method does not involve dissolution and recrystallization of any of the solid phases present in sylvinite—potassium chloride and sodium chloride. Both components, i.e. halite and sylvine, remain in their native state, which means that potassium chloride particles encapsulated in halite crystal aggregates end up in waste, and particles of insoluble minerals (calcium sulfate anhydrite, dolomite, clay) also remain bonded with the halite component of the ore. That is what causes potassium losses in this enrichment method. At the same time, some sodium chloride particles encapsulated in halite crystal aggregates and particles of insoluble minerals bonded with sylvine end up in the concentrate—hence the reduced potassium chloride content in the concentrate.

Another drawback of the method is a high level of contamination of the halite waste with foreign substances that prevent such halite from being commercialized as sodium chloride.

Therefore, both methods are characterized by incomplete separation of potassium chloride from the ore, with 3% of potash ending up in the halite waste. It is equally important to note high amounts of the halite waste: 3-4 tonnes per tonne of KCl. Despite the high of sodium chloride content (up to 95% in the flotation method and up to 97% in the halurgic method), that material cannot be used as a source of food grade salt because such halite is contaminated with insoluble impurities and potassium chloride and, in case of separation by flotation, also with flotation agents.

Other, albeit less common, method of enrichment of sylvinite ore is electrostatic separation. In physical and chemical terms, this method is similar to the halurgic method (halite and sylvine contained in the ore remain unchanged), it has similar rate potassium extraction into the concentrate and it has the impurity content in the concentrate and halite waste akin to the flotation method. The advantages of this method include lower operating costs than those of the flotation method, and the drawbacks are the same as of the flotation method, except that organic impurities of the halite waste are free from flotation agents; however, other organic reagents will be involved that are required for electrostatic separation of sylvine.

U.S. Pat. No. 2,329,149 discloses a method of separating potassium chloride from a pulp containing potassium and sodium chlorides by flotation with flotation agents. The maximum separation rate of potassium chloride is no more than 85%, which is a major drawback of this method.

U.S. Pat. No. 2,604,988 discloses a method of separation of potassium chloride and sodium chloride from ore, in particular, from sylvinite ore by at least one stage of flotation with the help of a flotation agent to recover potassium chloride into a froth. This method does not involve stages of separation of potassium chloride and sodium chloride from other components of sylvinite ore, which does not allow to produce potassium chloride concentrate with a high potassium chloride content, and neither does it allow to produce sufficiently pure sodium chloride. In addition, this method does not ensure conditions for complete dissolution of halite, which also results in incomplete separation of potassium chloride.

U.S. Pat. No. 8,888,867 discloses a method of producing sodium chloride comprising the steps of preparing a brine having a sodium chloride concentration which is higher than the sodium chloride concentration of the eutectic point but lower than the sodium chloride concentration of a saturated brine by dissolving a sodium chloride source in water; cooling the resulting brine by indirect cooling in a self-cleaning fluidized bed heat exchanger/crystallizer to a temperature lower than 0° C., but higher than the eutectic temperature of the resulting brine, thereby forming a slurry comprising sodium chloride dihydrate and a mother liquor, feeding the sodium chloride dihydrate to a recrystallizer to form sodium chloride and a mother liquor, and recycling at least part of the mother liquor. This method relates to production of only sodium chloride and excludes stages of separation of potassium chloride from the brine that is used as the primary material. Potassium chloride is separated only in the form of impurities, which makes it impossible to produce potassium chloride suitable for industrial solution. In addition, a major drawback of this method is that separation of impurities is mainly done through segregation of crystals by size, which makes it impossible to remove occluded liquid phase and finely dispersed impurities.

U.S. Pat. No. 6,267,789 discloses a method of enriching crude salt, in which the crude salt is cooled in a saturated aqueous sodium chloride solution to a temperature below the anhydrous sodium chloride to sodium chloride dihydrate transition temperature and, after cooling, a stock of a powder comprising sodium chloride crystals is collected, the said method being characterized in that the crude salt is ground before it is cooled and the powder is subjected to particle-size fractionation from which a fine particle-size fraction and a coarse particle-size fraction comprising the enriched salt are collected. The method appreciably enriches the salt, wherein the sodium chloride content amounts to 99.8%. However, it is obvious to the skilled person that such degree of purity is insufficient for use, inter alia, in the food industry. Such insufficient purity is due to the fact that impurities are mostly separated by means of crystal size fractionation, which does not ensure removal of the occluded liquid phase and finely dispersed impurities. Moreover, this method doesn't allow the separation of potassium chloride as a product, thus leading to loss of potassium chloride in the form of separable impurities.

U.S. Pat. No. 8,771,380 discloses a method of production of sodium chloride, comprising the steps of preparing a brine comprising at least 150 g/l of sodium chloride by dissolving a sodium chloride source in water, subjecting the resulting brine to a eutectic freeze crystallization step by indirect cooling of the said brine, in which leads to the formation of ice, sodium chloride dihydrate, and a mother liquor, separating the resulting sodium chloride dihydrate from the ice and, optionally, from the mother liquor at the eutectic temperature, so that a sodium chloride dihydrate-rich stream is formed, and feeding the said sodium chloride dihydrate-rich stream to a recrystallizer to form sodium chloride and a mother liquor. The formation of ice facilitates separation of the sodium chloride dihydrate, however, it produces a number of problems associated with equipment icing, which is the drawback of a sodium chloride production method comprising the step of eutectic crystallization by freezing.

U.S. Pat. No. 3,655,333 discloses a method of producing anhydrous sodium chloride, comprising incorporation of solid sodium chloride into the sodium chloride saturated brine containing dissolved organic or inorganic contaminants, in order to raise concentration in relation to the liquid phase. The temperature of such solid sodium chloride suspension is maintained within the range of about 0° C. to about −21° C., while simultaneously stirring the suspension enough to prevent the compaction of solid crystals during the period sufficient to produce the sodium chloride dihydrate. Sodium chloride dihydrate is then separated from the brine in the form of the solid matter, thereby producing the desired relative concentration of dissolved organic or inorganic impurities in the brine, after which the sodium chloride dihydrate is decomposed to produce solid anhydrous sodium chloride and the purified saturated brine. Solid sodium chloride is further separated from the brine and partially recirculated to the first step of the method in which solid sodium chloride is incorporated into the crude brine. This method cannot produce sufficiently pure sodium chloride because it excludes the step of particle size segregation of solid impurities. Moreover, this method doesn't allow the separation of potassium chloride as a product, thus, leading to loss of potassium chloride in the form of separable impurities.

In view of the foregoing, there is still a need for an effective method of separation of potassium chloride and sodium chloride from a polymineral source containing the said salts, in order to produce sufficiently pure potassium chloride and sodium chloride and to reduce wastes from such method.

SUMMARY OF THE INVENTION

The present inventors have addressed the aforementioned drawbacks of prior art by the method described herein.

The first subject matter item of the present invention is a method of separation of sodium chloride and potassium chloride from a polymineral source, containing sodium and potassium chlorides, which includes the following steps:

(i) feeding a pre-ground polymineral source into the upper zone of a vertical three-zone reactor filled with a sodium chloride and potassium chloride saturated solution, in which zone the temperature is maintained between −2.5° C. and −20° C., (ii) recrystallizing sodium chloride to form sodium chloride dihydrate and separating the resulting sodium chloride dihydrate crystals from crystals of potassium chloride by flotation to produce a froth containing potassium chloride crystals, whereas the sodium chloride dihydrate crystals fall down to the middle zone of the said vertical three-zone reactor, (iii) multistage sizing of the sodium chloride dihydrate crystals by an upward flow of liquid phase and simultaneous multistage countercurrent washing of the falling sodium chloride dihydrate crystals by the same upward flow of liquid phase, wherein the upward flow velocity is equal to the flotation velocity of particles whose hydrodynamic diameter is greater than the maximum hydrodynamic diameter of the polymineral source particles by not less than 20 microns; thus allowing the washed sodium chloride dihydrate crystals to enter the lower zone of the said vertical three-zone reactor, provided that the hydrodynamic diameter of the sodium chloride dihydrate crystals entering the lower zone of said vertical three-zone reactor exceeds the maximum hydrodynamic diameter of the polymineral source particles by at least 20 microns, (iv) recrystallizing the washed sodium chloride dihydrate crystals into anhydrous sodium chloride in the lower zone of the said vertical three-zone reactor filled with a sodium chloride saturated solution, in which zone the temperature is maintained between 0.5° C. and 15° C., to produce a suspension of anhydrous sodium chloride.

In one embodiment of the present invention, the polymineral source comprises sylvinite ore. In another embodiment of the present invention, the polymineral source comprises halite waste obtained from flotation enrichment of potassium chloride.

In one embodiment of the present invention, the polymineral source is preferably ground to obtain particles with a hydrodynamic diameter less than 90 microns, preferably, less than 70 microns, more preferably, within the range of 70 to 90 microns, whereas the minimum hydrodynamic diameter of the sodium chloride dihydrate crystals entering the lower zone of the three-zone reactor is within the range of 110 to 90 microns, provided that a higher upper limit of the size of the polymineral source particles corresponds to a higher lower limit of the hydrodynamic diameter of the sodium chloride dihydrate crystals.

In one embodiment of the method according to the present invention, the temperature in the upper zone of the said vertical three-zone reactor is maintained within the range of −3° C. to −5° C.

In one embodiment of the method according to the present invention, a sodium chloride and potassium chloride saturated solution has a NaCl concentration from 20.5 to 23 wt. % and a KCl concentration from 6 to 7 wt. %.

In one embodiment of the method according to the present invention, in the middle zone of the vertical three-zone reactor, the temperature of the upward flow of the liquid phase is maintained below 0° C., preferably, below −3° C.

In one embodiment of the method according to the present invention, the linear velocity of the upward flow of the liquid phase in the middle zone of the vertical three-zone reactor is within the range of 2 to 10 mm/s.

In one embodiment of the method according to the present invention, the sodium chloride solution produced from water released in the recrystallization step (iv) serves as the liquid phase in the middle zone of the vertical three-zone reactor.

In one embodiment of the method according to the present invention, the liquid phase in the middle zone of the vertical three-zone reactor is additionally turbulized to foster quantitative purification of sodium chloride dihydrate crystals.

In one embodiment of the method according to the present invention, the flotation in step (ii) involves the use of flotation agents.

In one embodiment of the method according to the present invention, the sodium chloride saturated solution filling the lower zone of the vertical three-zone reactor has a concentration of 26 to 26.6 wt. %.

In one embodiment of the method according to the present invention, the said method further includes, after step (iv), an additional step of washing the anhydrous sodium chloride crystals.

In one embodiment of the method according to the present invention, the said method further includes, after step (iv), a step of filtering and a step of drying the suspension of anhydrous sodium chloride to obtain anhydrous sodium chloride crystals.

In embodiment according to the present invention, in step (ii), the resulting sodium chloride dihydrate crystals are separated by flotation from potassium chloride crystals and insoluble residue, whereby a froth is formed containing the potassium chloride crystals together with the insoluble residue.

In one embodiment of the method according to the present invention, said method further includes, after step (ii), a step of removing the froth and a step of squeezing the froth product to obtain a potassium chloride concentrate.

In a specific embodiment of the method according to the present invention, the said method further includes a step of halurgic or flotation processing of the potassium chloride concentrate to obtain pure potassium chloride crystals.

This method of the present invention achieves the separation of more than 98% of potassium chloride into a concentrate having the purity of more than 98% of KCl, because physically and chemically, the method of the present invention ensures the complete dissolution and recrystallization of sodium chloride.

Halite, as the main component of the polymineral source, contains sylvine inclusions that are released as a result of grinding of the ore. However, some sylvine remains inside the crystalline aggregates of halite, and since the solution used for leaching has no access to surfaces of the potassium chloride crystals, the latter cannot be separated by either flotation or the halurgic method. In the method of the present invention, the supersaturated solution serves as a source of crystalline hydrate, and sodium chloride dihydrate does not co-crystallize with anhydrous salt nor with any other constituent of the polymineral source. This property is cornerstone for complete dissolution of the initial halite excluding the risk of secondary "encapsulation" of the polymineral source particles by the newly formed crystalline hydrate, which helps to achieve the described technical effect, namely, the quantitative separation of potassium chloride.

Furthermore, the authors of the present invention incidentally discovered that the said method also allows the separation of more than 99% of sodium chloride into a concentrate having the purity of more than 99.9% of NaCl, wherein the residual concentration of organic impurities (in particular, amines) is not detectable by standard methods of analytical control used in food grade product analysis.

Apart from that, the method of the present invention allows to reduce the amount of waste from sylvinite ore enrichment. In the existing enrichment methods, waste comprises solid halite and liquid slimes in the amount of 2 to 3 tonnes and 0.1 to 0.2 tonnes per tonne of concentrate, respectively. In the present invention, the waste comprises only slimes in the amount of 0.1 to 0.2 tonnes per tonne of concentrate, i.e., the total amount of waste is reduced more than 10 times.

The second subject matter item of the present invention is a vertical three-zone reactor for separation of sodium chloride and potassium chloride from a polymineral source containing sodium and potassium chlorides, which comprises:
- a first reservoir defining the upper zone of the reactor and comprising an aerator, a heat exchanger for heat removal and a first mixer, wherein the reservoir is equipped with a means of supply of ground polymineral source, flotation air inlet and outlet, means of supply of flotation agent, means of supply of other reagents, means of extraction of froth containing potassium chloride, and an input of saturated solution of sodium and potassium chlorides,
- a multistage countercurrent wash column defining the middle zone of the reactor,
- a second reservoir defining the lower zone of the reactor and comprising a heat exchanger for heat supply and a second mixer, wherein the second reservoir is equipped with a means of discharge of anhydrous sodium chloride suspension and means of supply of saturated solution of sodium chloride.

In one embodiment of the vertical three-zone reactor according to the present invention, the first reservoir comprises a cover in which are arranged a means of supply of ground polymineral source, inlet and outlet for flotation air, means of supply of flotation agent and means of supply of other reagents, while a means of extraction of froth containing potassium chloride and that of supply of saturated solution of sodium and potassium chlorides are arranged at the upper part of the side wall of the first reservoir.

In one embodiment of the vertical three-zone reactor according to the present invention, the means of discharge of anhydrous sodium chloride suspension is in the bottom of the second reservoir, and the means of supply of saturated solution of sodium chloride is in the side wall of the second reservoir.

In one embodiment of the vertical three-zone reactor according to the present invention, the heat exchanger for heat removal and/or the heat exchanger for heat supply is an internal heat exchanger.

In one embodiment of the vertical three-zone reactor according to the present invention, the heat exchanger for heat removal and/or the heat exchanger for heat supply is an external heat exchanger.

In one embodiment of the vertical three-zone reactor according to the present invention, the heat exchanger for heat supply and the heat exchanger for heat removal are integrated into a single closed thermal circuit representing a heat pump.

In a specific embodiment of the vertical three-zone reactor according to the present invention, the said multistage countercurrent wash column is a rotary disk column.

In a specific embodiment of the vertical three-zone reactor of the present invention, the said multistage countercurrent wash column is a pulse column.

In a specific embodiment of the vertical three-zone reactor according to the present invention, the said reactor comprises an additional multistage countercurrent wash column under the second reservoir.

In a specific embodiment of the vertical three-zone reactor according to the present invention, the said additional multistage countercurrent wash column is a pulse column.

In a specific embodiment of the vertical three-zone reactor according to the present invention, the said additional multistage countercurrent wash column is a rotary disk column.

In a specific embodiment of the present invention, the means of supply and/or the means of discharge are defined by a supply tube and/or a discharge tube.

In a specific embodiment of the present invention, the described vertical three-zone reactor according to the present invention is designed to perform the described method of separation of potassium chloride and sodium chloride according to the present invention and allows to perform the said method of the present invention in an uninterrupted manner in a single reactor.

DETAILED DESCRIPTION OF THE INVENTION

Figure 1:
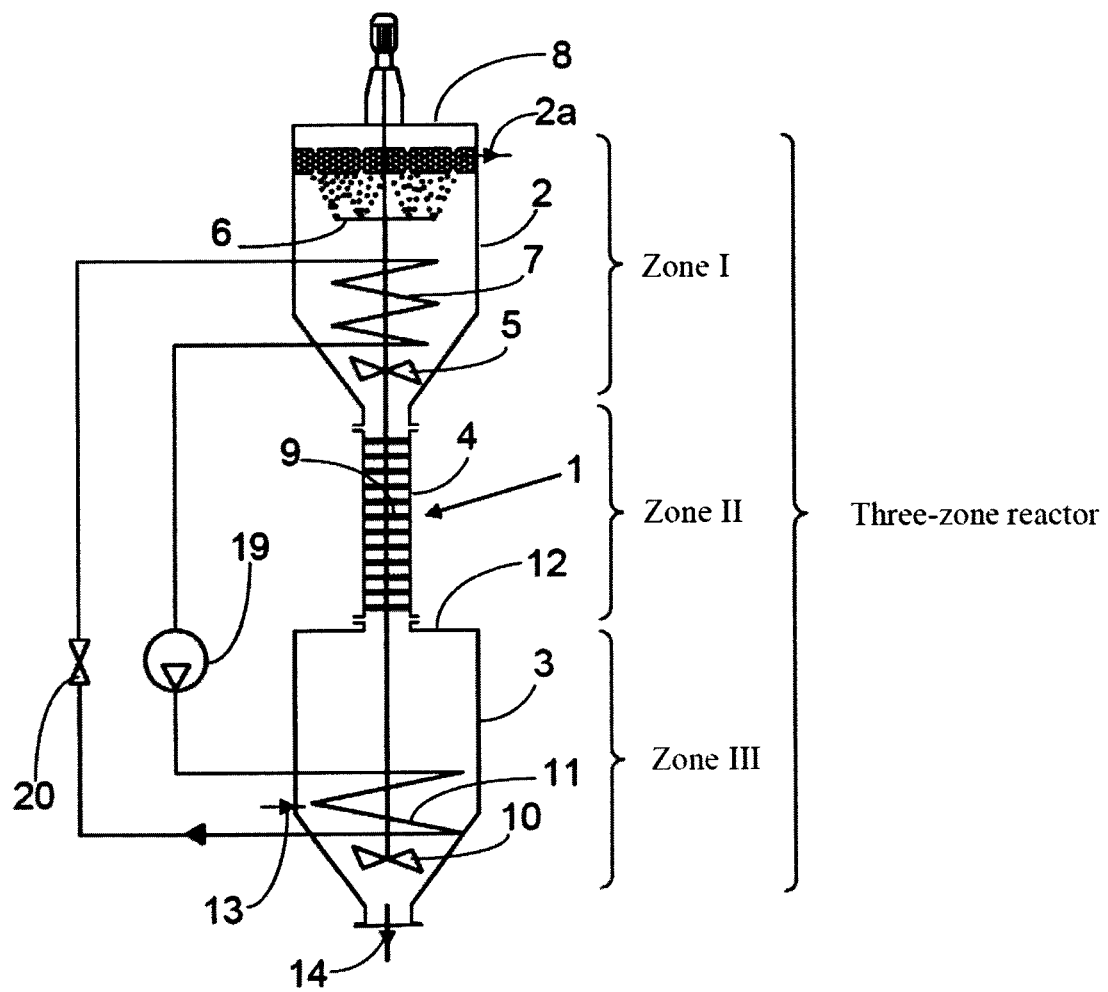
FIG. 1 is a schematic diagram of the vertical three-zone reactor for separation of sodium chloride and potassium chloride from a polymineral source.

The present invention relates to a method of separation of potassium chloride and sodium chloride from a polymineral source comprising sodium chloride and potassium chloride, which includes the following steps:
  (i) feeding a pre-ground polymineral source into the upper zone of a vertical three-zone reactor filled with a sodium chloride and potassium chloride saturated solution, where the temperature is maintained between −2.5° C. and −20° C.,
  (ii) recrystallizing sodium chloride to form sodium chloride dihydrate and separating the resulting sodium chloride dihydrate crystals from crystals of potassium chloride by flotation so as to produce a froth containing potassium chloride crystals, while the sodium chloride dihydrate crystals fall down to the middle zone of the said vertical three-zone reactor, (iii) multistage sizing of the sodium chloride dihydrate crystals by an upward flow of liquid phase and simultaneous multistage countercurrent washing of the falling sodium chloride dihydrate crystals by the same upward flow of liquid phase, wherein the upward flow velocity is equal to the flotation velocity of particles whose hydrodynamic diameter is greater than the maximum hydrodynamic diameter of the polymineral source particles by not less than 20 microns, whereafter the washed sodium chloride dihydrate crystals enter the lower zone of the said vertical three-zone reactor, provided that the hydrodynamic diameter of the sodium chloride dihydrate crystals entering the lower zone of the said vertical three-zone reactor exceeds the maximum hydrodynamic diameter of the polymineral source particles by at least 20 microns, (iv) recrystallizing the washed sodium chloride dihydrate crystals into anhydrous sodium chloride in the lower zone of the said vertical three-zone reactor filled with a sodium chloride saturated solution, in which zone the temperature is maintained between 0.5° C. and 15° C., to produce a suspension of anhydrous sodium chloride.

In the context of the present invention, the term "polymineral source comprising sodium chloride and potassium chloride" shall be read as referring to sylvinite ore, as well as waste produced by flotation enrichment of potassium chloride.

"Sylvinite ore" means a mixture consisting mainly of potassium chloride and sodium chloride in the proportion of 1:1000 to 1000:1, the sum of their percentage contents in the mixture exceeding 80%, and other impurities that accompany sylvine and halite in the natural deposits of potassium salts, such as dolomite, carnallite, anhydrite, kieserite, clay, etc., with their aggregate content of less than 20%, in terms of an anhydrous mixture. A mixture of potassium chloride and sodium chloride can also be of artificial origin, specifically, that can be a concentrate resulting from the electrostatic enrichment method, halite waste from flotation or halurgic method, cyclone dust from various enrichment processes.

"Waste produced by flotation enrichment of potassium chloride" means a mixture resulting from flotation enrichment of sylvinite. Flotation enrichment of sylvanite ensures only partial extraction of potassium chloride at 84 to 86%, while the rest of it passes to the halite waste. The content of potassium in the halitic wastes is 2.5% to 3%. The amount of such waste is quite significant: 3 to 4 tonnes per tonne of KCl, and despite its high sodium chloride content (93% to 95%) it is generally not accepted as a source of NaCl because of contamination of halite, firstly, with amines (a flotation reagent used in that method) that have carcinogenic properties and secondly, with insoluble impurities and potassium chloride.

Since the existing methods of purification of sodium chloride, regard had of the nature and composition of impurities present in the waste, are not cost effective from the point of view of subsequent applications of the resulting salt, these days such waste end up in landfills that present a number of environmental and technological risks.

Waste produced by flotation enrichment of potassium chloride has the following typical composition with regard to inorganic compounds:

TABLE 1

| NaCl | KCl | Insol. (clay) | $CaSO_4$ | $Br^-$ | $CaCO_3$, $MgCO_3$ | $Mg^{2+}$ | $Ca^{2+}$ |
|---|---|---|---|---|---|---|---|
| | | | Mass fraction, % | | | | |
| 95-97.5 | 0.5-1.5 | 0.5-1.5 | 1-2 | <0.02 | <0.5 | <0.5 | <0.5 | and the following typical composition with regard to organic compositions:

TABLE 2

| | |
|---|---|
| Collector (primary amine) | 50-80 g/t |
| Amine disperser (alcohols $C_5$-$C_8$) | <5 g/t |
| Apolar additives to collector (liquid petroleum waxes) | <15 g/t |
| Frothers (PEG, pine oil) | <5 g/t |
| Coagulant (PAM) | <8 g/t |
| Depressor (starch) | 30-200 g/t |

The term "potassium chloride concentrate" means a froth resulting from the flotation process, which has been squeezed (to a residual moisture content of 7% to 10%), comprising (in terms of an anhydrous product) 93% to 95% of potassium chloride, 2% to 3% of sodium chloride and 3% to 4% of insoluble residue. The composition of the latter varies depending on the properties of the sylvinite deposit and typically comprises anhydrous calcium sulfate, calcium and magnesium carbonates, aluminosilicates (clay), iron oxides and sulfides, as well as organic components. Once dried, the concentrate can be sent to granulation or recrystallized into a pure (more than 98% in terms of potassium chloride) halurgic quality product.

In the context of the present invention, the term "insoluble residue" means the solid phase remaining after dissolution of a sample of polymineral source (or sodium chloride, or potassium chloride concentrate) with a fivefold (by mass) amount of distilled water at 90° C., followed by quantitative washing from chloride ion and drying. The mass fraction of water-insoluble residue is determined by the gravimetric method according to GOST R 54345-2011 (Russian national standard).

In the context of the present invention, the term "hydrodynamic diameter of a particle" means the diameter of a spherical particle of a known density, which has the same drift rate with respect of the liquid medium subject to the same force as the one acting on the measured particle (see Russian national standard GOST R 8.712-2010: State system for ensuring the uniformity of measurements. Dispersion characteristics of nanometric aerosols and suspensions. Measurement methods).

In the context of the present invention, the term "maximum hydrodynamic diameter" means the mean hydrodynamic diameter of the last percentile on the differential particle size distribution curve.

The method of separation of potassium chloride and sodium chloride from a polymineral source comprising sodium chloride or potassium chloride will be described in detail below. The polymineral source is subjected to grinding ground. The pre-ground mixture is continuously fed into the upper zone of the vertical three-zone reactor. The liquid phase (mother liquor) of the upper zone is a solution saturated simultaneously with at least two salts, namely, with NaCl and KCl. The typical concentration of the salts in the solution is 20.5 to 23 wt. % of NaCl and 6 to 7 wt. % of KCl.

The upper zone temperature is maintained within such a range that one of the solid phases in equilibrium with the liquid phase is sodium chloride dihydrate. The said temperature range is from −20° C. to −2.5° C. Preferably, the temperature in the upper zone is maintained closer to the upper limit of the said range, namely, from −5° C. to −3° C.

When the salt mixture enters the upper zone of the reactor, only one of the salts—NaCl—is recrystallized, i.e., undergoes a double phase transition: anhydrous sodium chloride contained in the mixture is dissolved, thus causing the liquid phase to become supersaturated with respect to sodium chloride dihydrate. This supersaturation of the solution consequently drives the crystallization of a new solid phase—NaCl*2H$_2$O. All other components of the mixture either do not undergo any phase transition (all insoluble impurities and potassium chloride, with respect to which the solution is saturated) or undergo one phase transition—dissolution (calcium chloride and magnesium).

In the result of the recrystallization, all soluble and insoluble impurities encapsulated in crystalline aggregates of halite are released and pass into the volume of the upper zone in the form of a suspension or into the solution. So, what happens physically and chemically in the method according to the present invention is complete dissolution of halite followed by its complete recrystallization, thus considerably increasing the degree of potassium chloride separation compared to prior art.

Characteristic to the sodium chloride dihydrate lattice is that the distribution coefficient of impurities between the mother liquor and the solid phase is greater than $10^4$, in other words, the recrystallization effectively purifies dihydrate from all impurities, including soluble ones.

To prevent suppression of the recrystallization process, it is required to minimize, in the liquid phase of the upper zone, the concentration of ions whose water affinity is higher than that of Na$^+$ ions, namely Mg$^{2+}$ and Ca$^{2+}$. Accumulation of the said cations shifts down the temperature of NaCl—NaCl*2H$_2$O phase transition, and if the total concentration of these ions is more than 1.5 moles/l, the area of presence of sodium chloride dihydrate disappears completely. For that reason, the total concentration of bivalent cations in the liquid phase is kept below 2 wt. %, preferably below 1 wt. %, which is achieved by continuously dosing into the reactor upper zone the corresponding amount of a reagent that transfers the Mg$^{2+}$ and Ca$^{2+}$ cations to calcium and magnesium compounds of poor solubility. The functions of that said reagent can be fulfilled by sodium or potassium salts with anions such as carbonate, phosphate, oxalate, sulfide—preferably sodium carbonate.

The stationary mineral composition of the solid phase suspended in the mother liquor in the upper zone comprises, first of all, growing crystals of "pure" sodium chloride dihydrate, "dirty" crystals of anhydrous sodium chloride in the process of dissolution, crystals of native potassium chloride, insoluble native impurities (CaSO$_4$, CaCO$_3$, MgCO$_3$, clay), as well as calcium and magnesium carbonates of secondary origin, i.e. obtained in the upper zone of the reactor as a result of conversion of calcium and magnesium chlorides by means of sodium carbonate.

The preferred recrystallization mode was found in the area of thermodynamic parameters close to the line of NaCl—NaCl*2H$_2$O phase transition, namely, in the temperature range of −5° C. to −3° C. It is in these conditions (composition of liquid phase and temperature range in the upper zone) the abnormal course of crystallization of dihydrate was experimentally discovered—it is not accompanied, as usual, by the appearance of small particles and further growth thereof; instead, after a short period of induction, during which crystalline phase is completely absent, crystals start emerging in the solution that are already relatively large, with a hydrodynamic diameter of more than 70 microns, and shortly grow to the size corresponding to a sizing boundary, i.e., >90 microns, preferably, >110 microns.

The correlation of particle sizes of the polymineral source and sodium chloride dihydrate crystals is configured in such a way that the stationary particle size distribution of sodium chloride dihydrate crystals in the upper zone includes a large crystalline fraction with a hydrodynamic diameter greater than the maximum hydrodynamic diameter of polymineral source particles by not less than 20 microns. The presence of the sodium chloride dihydrate crystal fraction with significant hydrodynamic diameter of is achieved by lowering the degree of solution supersaturation which, in turn, is done by means of common chemical processes, e.g., by reducing the feed of raw mixture in the conditions of intense agitation. In this way, as long as the recrystallization mode is maintained as described for the suspended solid phase, the stationary particle size distribution of the initial mixture particles is narrower on the upper limit side than the stationary particle size distribution of sodium chloride dihydrate crystals: the composition of newly formed dihydrate comprises a fraction with a hydrodynamic diameter of sodium chloride dihydrate crystals which exceeds the maximum hydrodynamic diameter of polymineral source particles by at least 20 microns.

The presence of this fraction of sodium chloride dihydrate crystals with the hydrodynamic diameter exceeding the hydrodynamic diameter of polymineral source particles ensures a clear subsequent size fractionation of initial mixture particles from crystals of pure sodium chloride dihydrate in the middle zone of the reactor.

During the crystallization of sodium chloride dihydrate, latent crystallization heat is emitted, therefore, to maintain the upper zone temperature within the predetermined range, heat has to be removed, for example, without limitation, through the wall of a heat exchanger, either external or immersed directly into the suspension in the upper zone.

Potassium chloride crystals and insoluble impurities are separated from sodium chloride dihydrate in the upper zone by known methods of the art, preferably, by flotation. Potassium chloride, together with accompanying impurities, is discharged via an upper drain in the form of froth containing potassium chloride and insoluble residue. The surface of potassium chloride is partially hydrophobized by known flotation reagents used in the industrial flotation enrichment, for instance, primary amine as collector, alcohols $C_5$-$C_8$ as amine disperser, liquid petroleum waxes as apolar additives to collector, pine oil as frother, polyacrylamide as coagulant, and starch as depressor.

The flotation method ensures strict separation of potassium chloride and insoluble impurities from sodium chloride dihydrate. Typically, the flotation of potassium chloride is carried out at temperatures incompatible with presence of NaCl dihydrate crystals in the solution. However, it was unexpectedly discovered that, in the selected crystallization temperature and concentration conditions, the liquid phase affinity of dihydrate crystals is significantly higher than that of anhydrous sodium chloride, which excludes adhesion of air bubbles to growing crystals even under sub-zero temperatures and prevents sodium chloride dihydrate from ending up in the froth.

To support the flotation, an air inlet is arranged in the upper zone of the reactor, and at the same time flotation reagents are continuously dosed into said upper zone. As a result, the liquid phase in the upper zone has a stationary concentration of organic additives, which are flotation reagents including primary amines.

The lower part of the reactor upper zone leads into the coaxially positioned middle zone of the reactor. The middle zone is where multistage size fractionation of crystals is carried out using an upward flow of liquid phase, as well as the multistage countercurrent washing of falling crystals by the same upward flow of liquid phase.

The sodium chloride dihydrate crystals in the upper zone have a wide stationary size distribution, including, in particular, a crystal fraction with a hydrodynamic diameter which is greater than the maximum hydrodynamic diameter of the polymineral source by 20 microns.

A sizing boundary is defined by the upward flow velocity which is so fixed that only the aforementioned large crystals can pass through the middle zone down to the lower zone, while the polymineral source particles remain in the upper zone. Despite the continuous removal of the large dihydrate fraction whose crystal sizes are greater than the sizing boundary, the presence of the said coarse fraction in the first zone is maintained by continuous growth of smaller sodium chloride dihydrate crystals whose size was smaller than the defined sizing boundary.

To completely exclude the passage of small particles through the middle zone, the sizing of the particles in the said zone is organized in a multistage manner, which is ensured by a sufficient number of inner partition devices (plates) inhibiting the longitudinal mixing of countercurrent flows of solid and liquid phases. The partition devices form a sequential cascade of steps which divides crystals quantitatively according to the predetermined size boundary.

The combination of parameters, such as crystal size (hydrodynamic diameter) and density, liquid phase density and viscosity predetermine a low linear velocity of the upward flow of the washing fluid required for particle size fractionation at the boundary of more than 90 microns, preferably more than 110 microns, and more preferably between 90 and 110 microns, to the said velocity ranging within 2 to 10 mm/s. Velocities this low, while ensuring the separation of sodium chloride dihydrate from impurities insoluble in the mother liquor, do not allow washing out soluble impurities and a finely dispersed clay, which are present in the occluded liquid phase captured by the crystals from the "dirty" upper zone. The liquid phase can be captured by the dihydrate crystals in the form of an "adherent" boundary layer of fluid in the conditions of laminar flow of.

To quantitatively wash the crystals from the occluded liquid phase, each liquid batch disposed between the corresponding partition devices is turbulized by communicating tangential velocity, i. e. perpendicular to the reactor axis.

The turbulization is achieved by means of external mechanical energy, for example, by turning rotors mounted between partition devices. Preferably, the effect of turbulization is created by periodic pulsation of the column of liquid within the reactor. The pulsation creates an instantaneous velocity of the liquid phase with a magnitude sufficient to destroy the adherent boundary layer, which, coupled with the desired number of steps, ensures the quantitative purification of the dihydrate crystals from the soluble impurities and clay.

After the multistage size fractionation and countercurrent washing in the middle zone, the sodium chloride dihydrate crystals with the hydrodynamic diameter exceeding the maximum hydrodynamic diameter of polymineral source particles by at least 20 microns enter the lower "clean" zone of the reactor. The lower zone is filled with a suspension, in which the liquid phase (mother liquor) is a solution saturated with NaCl. The typical salt concentration in the solution is: 26 to 26.6 wt. % of NaCl.

The lower zone temperature is maintained within such a range that anhydrous sodium chloride is the solid phase that is in equilibrium with the liquid phase. The said temperature range is +0.15° C. and up. Preferably, the lower zone temperature is maintained closer to the lower limit of the said range, namely, from +1° C. to +2° C.

When entering the lower zone of the reactor, sodium chloride dihydrate is recrystallized, i.e. subjected to double phase transition: the sodium chloride dihydrate is dissolved, whereby the liquid phase becomes supersaturated with anhydrous sodium chloride. This supersaturation of the solution consequently drives the crystallization of a new solid phase—anhydrous NaCl.

Dissolution of sodium chloride dihydrate is accompanied by absorptions of latent crystallization heat, therefore, to maintain the lower zone temperature within the predetermined range the heat is supplied, for example, without limitation, through the wall of a heat exchanger, either external or immersed directly into the suspension in the lower zone Since the amount of heat produced during the recrystallization of anhydrous sodium chloride into dihydrate in the upper zone is equal to the amount of heat required to perform the opposite process in the lower zone, the heat is supplied to, and removed from, the respective zones by means of a heat pump.

The stationary composition of the solid phase suspended in the mother liquor of the lower zone comprises the growing crystals of anhydrous sodium chloride and crystals of sodium chloride dihydrate in the process of dissolution.

Apart from heat, the recrystallization is also accompanied by release of liquid phase production—two moles of water per mole of dihydrate that have been brought in the crystalline state from the upper zone. Although the water has been captured in the "contaminated" zone, virtually no impurities end up in the composition of crystalline hydrate, consequently, the lower zone is supplied with pure water from the upper zone with no external source involved. The water is purified by means of fractional crystallization in the upper zone and countercurrent washing in the middle zone of the reactor.

The newly formed liquid phase is displaced by the downward flow of dihydrate crystals up to the middle zone, thus generating an upward flow of a pure sodium chloride solution. The latter represents the washing fluid which is used in the middle zone for countercurrent sizing and washing of dihydrate crystals.

The upward flow of the washing fluid is driven by the difference in the densities between sodium chloride dihydrate crystals and the saturated sodium chloride solution. In the present invention, the countercurrent movement of liquid and solid phases is achieved without any mechanical drivers and takes place within a single reactor; dihydrate crystallization, washing from impurities and recrystallization to obtain anhydrous salt are carried out without the separation of the dihydrate solid phase from the liquid phase of the mother liquor.

To prevent recrystallization of sodium chloride dihydrate into anhydrous sodium chloride in the washing step within the reactor middle zone, the temperature of the washing fluid upward flow is kept below 0° C., preferably, below −3° C., and to that end a heat exchanger is used with a coolant circulating therein.

Newly formed crystals of anhydrous sodium chloride are removed from the lower zone as a suspension; they are further separated from the liquid phase by known techniques, then dried and can be finally used as a source of high-purity salt.

The upper-zone froth consisting of potassium chloride crystals and insoluble residue is recycled by known techniques, e.g., by the halurgic method, specifically, after decantation, potassium chloride is leached with the recycled hot mother liquor and subsequently crystallized to obtain a halurgic quality product.

The only waste of the described sylvinite ore processing method is an insoluble residue concentrate consisting of calcium sulfate, magnesium and calcium carbonates, clay and occluded solution saturated with sodium and potassium chlorides.

It should also be noted that the major characteristic feature of the method according to the present invention is the multistage sizing of sodium chloride dihydrate crystals using the upward flow of liquid phase and the simultaneous multistage countercurrent washing of descending sodium chloride dihydrate crystals by the same upward flow of liquid phase, since the raw material of interest contains, in addition to the insoluble impurities, soluble contaminants that, during the recrystallization, transfer into the mother liquor:
  calcium and magnesium chlorides, sodium sulfate,
  potassium chloride, for which there are no chemical methods of purification from the NaCl solution,
  calcium sulfate dihydrate, whose solubility significantly increases in a NaCl solution compared to pure water; even though the initial halite composition may be free from this impurity, the latter can be formed in the solution as a result of chemical purification of the liquid phase from sodium sulfate,
  bromides, iodides,
  soluble organic compounds and surfactants, in particular, amines (flotation agents),
  particles of finely dispersed clay that act like truly soluble substances: the size of these particles in highly mineralized solutions does not exceed 1-2 microns, which causes these particles to move concurrently with turbulent pulsations of the liquid phase, and they cannot be fully separated from the mother liquor together with the fine fraction by means of particle size fractionation.

In the absence of the step of multistage sizing of sodium chloride dihydrate crystals and multistage countercurrent washing of descending sodium chloride dihydrate crystals, the aforelisted impurities inevitably end up, in the composition of the occluded mother liquor, in one of the products, which is sodium chloride.

To perform the method of separation of potassium chloride and sodium chloride from a polymineral source, as described in detail above, the authors of the present invention have developed a vertical three-zone reactor (shown in FIG. 1 and FIG. 2) allowing to implement the method of separation of potassium chloride and sodium chloride in an uninterrupted manner in a single reactor.

The vertical three-zone reactor according to the present invention, as shown in FIG. 1, is a column-type apparatus 1 comprising an upper cylindroconical reservoir 2, a lower cylindroconical reservoir 3 and a column 4 placed in the middle section of apparatus 1 between reservoirs 2 and 3.

The upper reservoir 2 corresponding to the upper zone I of the reactor is equipped with a mixer 5, an inner device 6 for pulp aeration, and an integrated heat exchanger 7 for pulp cooling.

Typically, the upper cylindroconical reservoir 2 is closed with a top cover 8 provided with various flow supply and discharge pipes, in addition, a discharge pipe 2a for froth product flow is provided in an upper part of the side wall of reservoir 2.

The following processes are conducted in the upper zone I of the reactor:
  recrystallization of anhydrous sodium chloride, which is the main component of pre-ground sylvinite ore, to produce large crystals of sodium chloride dihydrate with a hydrodynamic diameter greater than 90 microns, preferably greater than 110 microns, and, more preferably, within the range of 90 to 110 microns,
  flotation of potassium chloride crystals and insoluble impurities into a froth, which, after squeezing out the liquid phase, becomes a target potassium chloride concentrate,
  reagent-aided purification of the liquid phase from soluble cations $Ca^{2+}$ and $Mg^{2+}$ and, if necessary, from other ions by means of externally supplied sodium carbonate.

The lower conical part of the upper reservoir 2 is connected to column 4 that corresponds to the middle zone II of reactor 1. Inside column 4, an appropriate number of inner partition devices 9 are arranged preventing the countercurrent flows of liquid and solid phases from longitudinal mixing. The partition devices form a cascade of sequential steps cascade that segregates crystals according to a predetermined size boundary.

As an option, middle zone II of reactor 1 can be arranged as a rotary disk column, in which each cascade is an assembly of a turning disc (rotor) and an annular diaphragm (stator), or, in one of the preferred embodiments, as a pulsing column. In the latter case, partition devices 9 are plates with a flow section of 20-50%, and a pipe is arranged in the lower part of the column, which is connected to an external generator of pulsations of the fluid in the three-zone reactor.

The following processes are conducted in the middle zone II of the reactor:
  multistage size fractionation of crystals by an upward flow of a liquid phase, thanks to which the column allows only large (e.g., more than 90 microns) crystals of sodium chloride dihydrate to pass down (to the lower zone) and keeps small dihydrate crystals and particles of the initial mixture pre-ground to particle hydrodynamic diameter less than 70 microns from passing through,
  multistage countercurrent washing of sodium chloride dihydrate crystals from occluded liquid phase captured from the upper zone and containing various organic and inorganic impurities, in particular, potassium, calcium and magnesium cations, sulfate anions, flotation agents. The washing step is performed by the upward flow of the liquid phase coming from the lower zone of the reactor, which is a pure saturated solution of sodium chloride.

The lower cylindroconical reservoir 3 defining the lower zone III of reactor 1 is equipped with a mixer 10 and an integrated heat exchanger 11 for pulp heating. The upper cover 12 of this reservoir 3 is attached to the lower end of column 4. The lower, conical part of reservoir 3 is provided with a discharge pipe 14 for pure anhydrous sodium chloride suspension. The side wall can comprise a discharge pipe 13 for saturated sodium chloride solution obtained in the step of separation of the solid phase from the pure anhydrous sodium chloride suspension.

The following processes are conducted in the lower zone:
recrystallization of sodium chloride dihydrate coming from the column (middle zone) to produce anhydrous sodium chloride crystals,
production of a liquid phase flow moving towards the column part of the reactor (middle zone), which is required for the multistage crystal sizing and multistage countercurrent washing thereof, as a result of water release from crystalline hydrate during its recrystallization.

Figure 2:
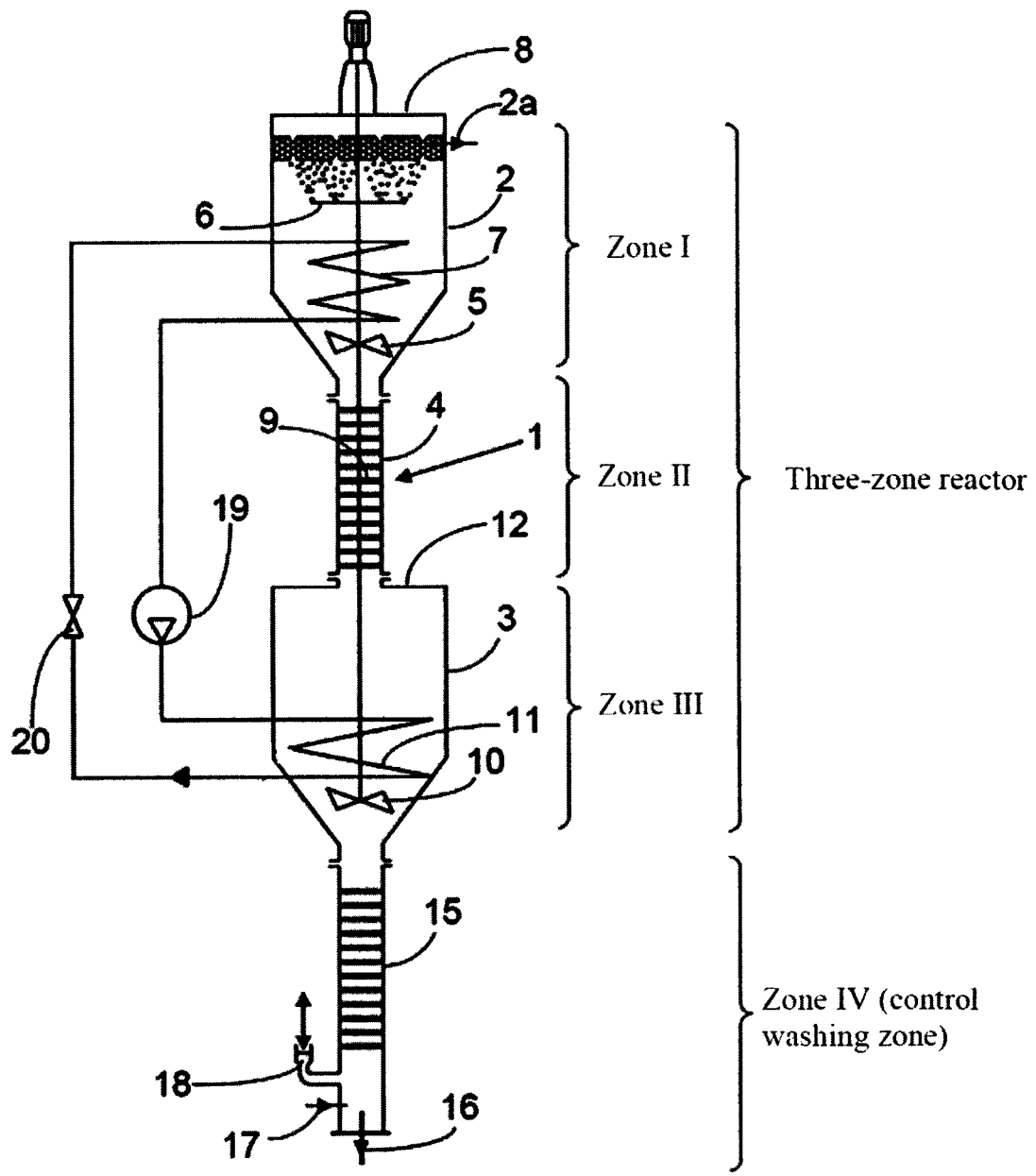
FIG. 2 is a schematic diagram of the vertical three-zone reactor for separation of sodium chloride and potassium chloride from a polymineral source, having an additional column.

FIG. 2 shows another embodiment of the vertical three-zone reactor according to the present invention. It has no fundamental differences from the reactor shown in FIG. 1, however, to quantitatively purify sodium chloride from toxic flotation reagents, the lower part of the reactor is equipped with an additional control washing column 15 defining the additional zone IV of reactor 1. The configuration of the additional column 15 is similar to the configuration of the column 4 disposed in the middle zone II of reactor 1 and it is preferably a pulse column. A discharge pipe 16 for pure anhydrous sodium chloride suspension and an inlet pipe 17 for an external flow of the saturated sodium chloride solution required for the multistage countercurrent washing are disposed in the lower part of the additional column 15. If the additional column 15 is used, an external pulse generator 18 is connected to generate pulsations of the columns of fluid in the middle zone II and the additional zone IV of reactor 1.

The following process takes place in the additional column 15:
multistage countercurrent washing of anhydrous sodium chloride crystals from the occluded liquid phase captured in the lower zone. The washing step is carried out by the upward flow of the liquid phase fed into the lower zone of the additional column, which is a pure saturated solution of sodium chloride.

Since the upper and lower zones I and II of reactor 1 accommodate processes requiring the equal amount of heat to be removed (in the upper zone I) and supplied (in the lower zone II), the heat balance is maintained by a heat pump comprising two heat exchangers 7 and 11, i.e. a condenser in the lower zone II and an evaporator in the upper zone I of reactor 1, a compressor 19 and a throttling device 20, together forming a closed thermal circuit which, in terms of technical thermodynamics, is a heat pump, as shown in FIGS. 1 and 2.

Figure 3:
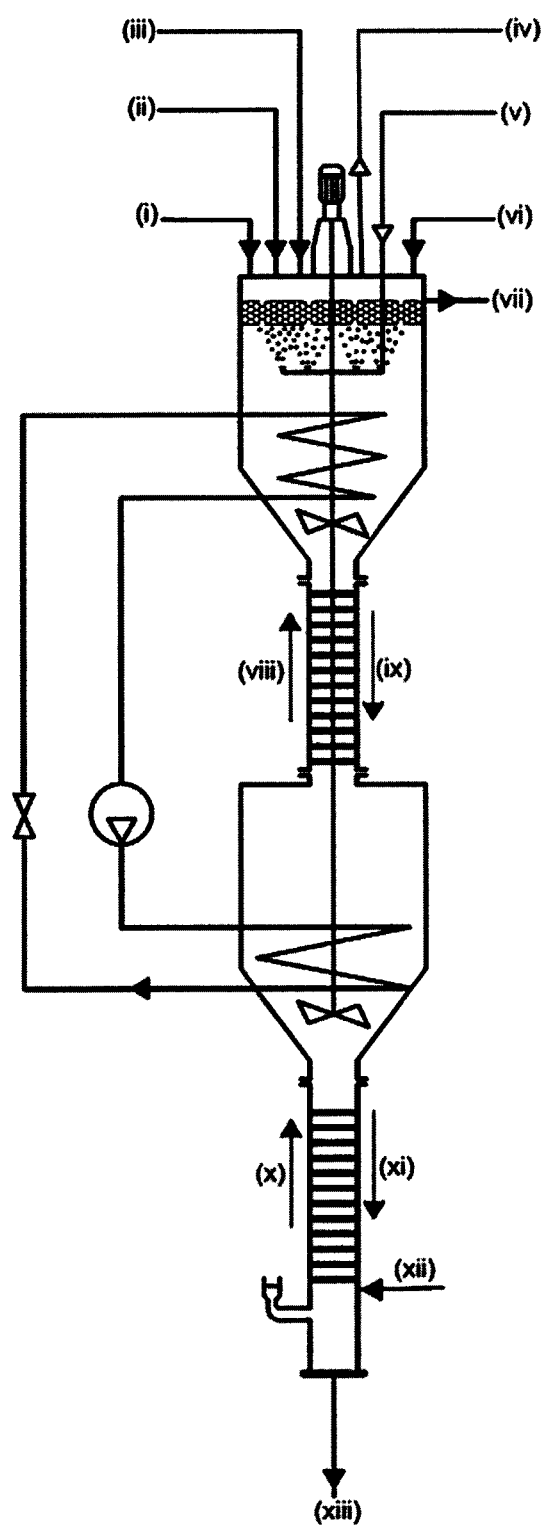
FIG. 3 is a diagram of flows in the vertical three-zone reactor shown in FIG. 2.

In addition, FIG. 3 is a diagram of flows in the vertical three-zone reactor shown in FIG. 2, where.
(i) is an input flow of the flotation agent;
(ii) is an input flow of sodium carbonate;
(iii) is an input flow of the ground polymineral source;
(iv) is an output flow of waste air;
(v) is an input air flow for flotation;
(vi) is an input flow of solution saturated with sodium chloride and potassium chloride;
(vii) is an output flow of the froth product;
(viii) is an upward flow of pure sodium chloride solution;
(ix) is a downward flow of sodium chloride dihydrate crystals;
(x) is an upward flow of pure sodium chloride solution;
(xi) is a downward flow of sodium chloride crystals;
(xii) is an input flow of pure sodium chloride solution; and
(xiii) is an output flow of the sodium chloride suspension.

The present invention is further described with reference to the examples below.

Example 1

For this experiment, an ore sample of 1.6 kg from the Starobinski potash deposit was used, having the following composition (in wt. %):
KCl—28.2%
NaCl—69.1%
$MgCl_2$—0.34%
$CaSO_4$—1.46%
Clay, silicates, carbonates—0.9%

The sample was dried and then ground in an impact mill, whereupon a fraction with a hydrodynamic diameter of ≤70 microns was sieved.

A separate experiment demonstrated that the hydrodynamic diameter of ground particles smaller than or equal to 70 microns, corresponds to the fraction produced by the dry sieving method (GOST 18318-94) passing through a square meshed sieve of 80×80 microns. The mass of the fraction with particle hydrodynamic diameter of ≤70 microns was 1384 g. A vertical three-zone reactor made of organic glass with total volume of 15 liters was filled with a saturated solution of sodium chloride pre-cooled to 0° C., the said solution prepared from bidistilled water and anhydrous sodium chloride classified as "analytically pure". After the start of external supply of a pure NaCl solution in the lower zone of the reactor, an appropriate amount (345 g) of halurgic quality potassium chloride was supplied by a feeder into the upper zone of the reactor, as required to saturate the mother liquor in the upper zone with potassium chloride.

After filling an immersed heat exchanger in the upper zone with coolant and achieving the upper zone solution temperature of −5° C., a ground fraction of sylvinite ore was fed into the upper zone, and simultaneously the flow rate of external washing fluid was increased to 2 l/h.

After a while, the formation of a suspended layer of sodium chloride dihydrate crystals was observed in the upper zone, and over the course of the experiment, the liquid phase turbidity increased from 3 FEU to 1700 FEU. When the hydrodynamic diameter of the crystals reached ≥90 microns, i.e. the value at which the particle flotation velocity exceeds the velocity of the upward flow of washing fluid, dihydrate started falling down to the middle zone represented by the section of the pulse column disposed in the middle part of the reactor. Having passed the middle zone, dihydrate crystals entered the lower zone, where the immersed heat exchanger maintained the temperature at the level of +3° C. Once first dihydrate crystals appeared in the middle zone, the flow rate of the external washing fluid was gradually decreased to reach 0.5 l/h at the end of the experiment.

In the lower zone, dihydrate recrystallized to produce anhydrous sodium chloride. The lower zone was used as a collector for anhydrous NaCl crystals produced in the experiment. Over the course of the experiment, the liquid phase turbidity in the lower zone never exceeded 5 PEU. Once feeding of the ground ore was discontinued, the lower zone was cut off from the rest of the reactor by means of a valve, anhydrous sodium chloride crystals were separated in a nutsche filter, dried during 2 hours at 120° C. and analyzed.

The finished product with a mass of 920 g had the following chemical composition (in wt. %):
NaCl—99.92%
KCl—0.02%
$CaSO_4$—0.02%
Insoluble residue—0.01%
Total of soluble impurities (Mg, Ca, Rb, Br, I)—0.03%

Virtual absence of potassium chloride crystals in the composition of the anhydrous sodium chloride fraction proves the quantitative extraction of the former into potassium chloride concentrate.

Example 2

The experiment was conducted according to Example 1. Once the feeding of the ground ore was discontinued, the flow rate of the external washing fluid was increased to 5 l/h, followed by wait time for dihydrate crystals to leave the upper zone (visual emptying control). After that, the upper zone was cut off from the rest of the reactor with a valve, the suspension from the upper zone was transferred into a thermostat it was heated to the temperature of 112° C. to dissolve native potassium chloride crystals collected in the upper zone over the course of the experiment.

Then, the suspension was filtered in a heated filter at 110° C. A resulting filtrate had a turbidity of 35 FEU. The filtrate was cooled in a thermostat under intensive agitation at a cooling rate of 7 deg/hour to achieve the temperature of 25° C., as a result of which potassium chloride was crystallized. Upon completion of the cooling process, the suspension was separated in a nutsche filter, the solid phase was washed once with a saturated potassium chloride solution, dried for 2 hours at 130° C. and analyzed.

The finished product with a mass of 272 g had the following chemical composition (in wt. %):
KCl—99.1%
NaCl—0.14%
$CaSO_4$—0.02%
Insoluble residue—0.74%

Example 3

For this experiment, a sample of 1.5 kg of halite wastes from flotation was used, having the following composition (in wt. %):
NaCl—95.2%
KCl—1.6%
$MgCl_2$—0.24%
$CaSO_4$—1.3%
Clay, silicates, carbonates—0.8%
Primary amines C18—0.02%
Water—0.84%

The sample was dried and then ground in an impact mill, whereupon a fraction of 90 microns was sieved.

A separate experiment demonstrated that the hydrodynamic diameter of ground particles smaller than or equal to 90 microns corresponds to the fraction produced by the dry sieving method (GOST 18318-94) passing through a square meshed sieve of 105×105 microns.

The mass of the fraction with particle hydrodynamic diameter of ≤90 microns was 1155 g. The experiment was conducted according to Example 1. Dihydrate started falling down to the middle zone represented by section of the pulse column disposed in the middle part of the reactor once the hydrodynamic diameter of the crystals reached ≥110 microns, i.e. the value at which the particle flotation velocity exceeds the velocity of the upward flow of the washing fluid. At the end of feeding of the ground halite, the liquid phase turbidity in the upper zone was 1220 FEU, whereas in the lower "pure" zone it was less than 5 FEU.

The finished product with a mass of 762 g had the following chemical composition (in wt. %):
NaCl—99.95%
KCl—0.01%
CaSO4—0.01%
Insoluble residue—0.03%
Primary amines C18—not found Example 4

For this experiment, an ore sample of 1.75 kg from the Starobinski potash deposit was used, having the following composition (in wt. %):
KCl—28.1%
NaCl—69.2%
$MgCl_2$—0.3%
$CaSO_4$—1.42%
Clay, silicates, carbonates—0.98%

The sample was dried and then ground in an impact mill, whereupon a fraction ≤70 microns was sieved. The mass of the fraction with the particle hydrodynamic diameter of ≤70 microns was 1504 g. The experiment was conducted according to Example 1. Additionally, prior to the ground ore feeding, a single load of flotation agents was supplied into the upper zone in the following amounts per 1 kg of the ore:

| Primary amine mixture C18-C20 | 45 mg |
| Apolar reagent (kerosene) | 12 mg |
| Frother (pine oil) | 35 mg |
| Flocculant (polyacrylamide) | 15 mg |

Along with the ground ore being fed into the upper part of the first zone, air was additionally supplied through a dispersing nozzle. At the end of the ground halite feeding, the liquid phase turbidity in the first zone was 430 FEU, whereas in the lower "pure" zone it was less than 3 FEU. The froth product was discharged to the nutsche filter, the solid residue was double-washed with the saturated sodium chloride solution to dissolve potassium chloride crystals on a selective basis. A microscopic examination of the precipitate performed after this procedure showed the absence of cubical crystals typical for sodium chloride, indicating high selectivity of flotation, specifically, that sodium chloride dihydrate crystals were not captured in the froth product.

The invention claimed is:
1. A method of separation of sodium chloride and potassium chloride from a polymineral source containing sodium and potassium chlorides, comprising the following steps:
(i) feeding a pre-ground polymineral source into an upper zone of a vertical three-zone reactor filled with a sodium chloride and potassium chloride saturated solution, wherein a temperature between −2.5° C. and −20° C. is maintained in the upper zone of the vertical three-zone reactor,
(ii) recrystallizing sodium chloride to form sodium chloride dihydrate crystals and separating the formed sodium chloride dihydrate crystals from potassium chloride crystals by flotation to produce a froth containing the potassium chloride crystals, wherein the sodium chloride dihydrate crystals fall down to a middle zone of said vertical three-zone reactor,
(iii) multistage sizing of the sodium chloride dihydrate crystals by an upward flow of a liquid phase and simultaneous multistage countercurrent washing of the sodium chloride dihydrate crystals falling down to the middle zone by the upward flow of the liquid phase, wherein the upward flow velocity is equal to a flotation velocity of sodium chloride dihydrate crystals whose hydrodynamic diameter is greater than a maximum hydrodynamic diameter of particles of the polymineral source by not less than 20 microns; thus, after the simultaneous multistage countercurrent washing, allowing the sodium chloride dihydrate crystals to enter a lower zone of the vertical three-zone reactor, provided that the hydrodynamic diameter of the sodium chloride dihydrate crystals entering the lower zone of said vertical three-zone reactor exceeds the maximum hydrodynamic diameter of the particles of the polymineral source by at least 20 microns, (iv) recrystallizing, after the simultaneous multistage countercurrent washing, the sodium chloride dihydrate crystals into anhydrous sodium chloride in the lower zone of the vertical three-zone reactor filled with a sodium chloride saturated solution, in which lower zone a temperature between 0.5° C. and 15° C. is maintained to produce a suspension of anhydrous sodium chloride.

2. The method according to claim 1, wherein the polymineral source is sylvinite ore.

3. The method according to claim 1, wherein the polymineral source is halitic waste produced by flotation enrichment of potassium chloride.

4. The method according to claim 1, wherein a temperature in the upper zone of the vertical three-zone reactor is maintained within a range of −3° C. to −5° C.

5. The method according to claim 1, wherein the sodium chloride and potassium chloride saturated solution has a NaCl concentration from 20.5 to 23 wt. % and a KCl concentration from 6 to 7 wt. %.

6. The method according to claim 1, where, in the middle zone of the vertical three-zone reactor, a temperature of the upward flow of the liquid phase is maintained below 0° C.

7. The method according to claim 1, wherein a linear velocity of the upward flow of the liquid phase in the middle zone of the vertical three-zone reactor is within a range of 2 to 10 mm/s.

8. The method according to claim 1, wherein a sodium chloride solution produced from water released in the recrystallizing of step (iv), serves as the liquid phase in the middle zone of the vertical three-zone reactor.

9. The method according to claim 1, wherein the liquid phase in the middle zone of the vertical three-zone reactor is additionally turbulized to foster quantitative purification of the sodium chloride dihydrate crystals.

10. The method according to claim 1, wherein the flotation in step (ii) involves the use of flotation agents.

11. The method according to claim 1, wherein the sodium chloride saturated solution filling the lower zone of the vertical three-zone reactor has a concentration of 26-26.6 wt. %.

12. The method according to claim 1, further including, after step (iv), an additional step of washing the anhydrous sodium chloride crystals.

13. The method according to claim 1, further including, after step (iv), a step of filtering and a step of drying the suspension of anhydrous sodium chloride to obtain anhydrous sodium chloride crystals.

14. The method according to claim 1, further including, after step (ii), a step of removing the froth and a step of squeezing a froth product to obtain a potassium chloride concentrate.

15. The method according to claim 14, further including a step of halurgic or flotation processing of the potassium chloride concentrate to obtain pure potassium chloride crystals.

* * * * *